(12) United States Patent
Chen

(10) Patent No.: US 10,554,515 B2
(45) Date of Patent: Feb. 4, 2020

(54) CUSTOMER PREMISES NETWORK ACCESS DEVICE FOR DISPLAYING DATA USAGE

(71) Applicant: Bright House Networks, LLC, East Syracuse, NY (US)

(72) Inventor: Yixin Jeff Chen, Jamesville, NY (US)

(73) Assignee: Bright House Networks, LLC, East Syracuse, NY (US)

( * ) Notice: Subject to any disclaimer, the term of this patent is extended or adjusted under 35 U.S.C. 154(b) by 634 days.

(21) Appl. No.: 14/985,636

(22) Filed: Dec. 31, 2015

(65) Prior Publication Data

US 2017/0195194 A1 Jul. 6, 2017

(51) Int. Cl.
*H04L 12/26* (2006.01)

(52) U.S. Cl.
CPC ........ *H04L 43/045* (2013.01); *H04L 43/0876* (2013.01)

(58) Field of Classification Search
CPC .......................... H04L 43/045; H04L 43/0876
USPC ........................................................ 709/224
See application file for complete search history.

(56) References Cited

U.S. PATENT DOCUMENTS

| | | | | |
|---|---|---|---|---|
| 6,056,562 | A * | 5/2000 | Kobayashi | H01R 13/631 439/125 |
| 7,124,368 | B1 * | 10/2006 | Subramanian | H04L 41/0681 715/736 |
| 7,280,971 | B1 * | 10/2007 | Wimberly | G06Q 20/102 705/63 |
| 8,046,378 | B1 * | 10/2011 | Zhuge | G06F 16/122 707/783 |
| 9,755,984 | B1 * | 9/2017 | Feroz | H04L 43/026 |
| 9,760,297 | B2 * | 9/2017 | Karr | G06F 3/0619 |
| 2002/0136231 | A1 * | 9/2002 | Leatherbury | H04L 12/2801 370/442 |
| 2002/0137467 | A1 * | 9/2002 | Tzannes | H04L 1/0002 455/69 |
| 2002/0138443 | A1 * | 9/2002 | Schran | G06Q 20/382 705/64 |
| 2003/0005112 | A1 * | 1/2003 | Krautkremer | H04L 41/0213 709/224 |
| 2003/0050074 | A1 * | 3/2003 | Kogiantis | H04W 72/1231 455/453 |
| 2003/0118089 | A1 * | 6/2003 | Deczky | H04L 1/0017 375/222 |
| 2003/0126254 | A1 * | 7/2003 | Cruickshank, III | H04L 41/00 709/224 |

(Continued)

*Primary Examiner* — David R Lazaro
*Assistant Examiner* — Berhanu Shitayewoldetadik
(74) *Attorney, Agent, or Firm* — Withrow & Terranova, PLLC

(57) ABSTRACT

A customer premises network access device includes a housing and a network interface unit at least partially disposed therein, for communicating with a data network and providing access to the data network to a user. The customer premises network access device also includes a processing unit disposed in the housing and connected to the network interface unit. The processing unit is configured to determine an aggregate amount of data associated with the network interface unit over a predetermined time period, and to determine a data value based on the determined aggregate amount of data. An exterior-facing display viewable to the user from outside the housing receives the data value from the processing unit, and displays an indicium based on the display value to the user.

20 Claims, 5 Drawing Sheets

(56) References Cited

U.S. PATENT DOCUMENTS

| | | | |
|---|---|---|---|
| 2003/0200303 A1* | 10/2003 | Chong | H04L 12/2801 709/224 |
| 2003/0214409 A1* | 11/2003 | Hickle | A61B 5/0836 340/573.1 |
| 2004/0043753 A1* | 3/2004 | Wake | G06Q 20/123 455/406 |
| 2004/0165533 A1* | 8/2004 | Izundu | H04L 41/0654 370/241 |
| 2004/0225732 A1* | 11/2004 | Coons | G06Q 10/06 709/224 |
| 2005/0063457 A1* | 3/2005 | Kumar | H04L 5/1438 375/222 |
| 2005/0249117 A1* | 11/2005 | Gerkins | H04L 47/6215 370/230 |
| 2006/0045009 A1* | 3/2006 | Madison | H04L 47/10 370/229 |
| 2006/0153216 A1* | 7/2006 | Hosein | H04L 1/0002 370/412 |
| 2007/0086417 A1* | 4/2007 | Jang | H04L 1/0025 370/347 |
| 2007/0106941 A1* | 5/2007 | Chen | H04N 7/17318 715/728 |
| 2007/0220013 A1* | 9/2007 | Rabines | G06F 21/6218 |
| 2008/0002576 A1* | 1/2008 | Bugenhagen | H04L 41/147 370/229 |
| 2008/0002670 A1* | 1/2008 | Bugenhagen | H04L 12/66 370/352 |
| 2008/0025721 A1* | 1/2008 | Wynman | H04J 3/14 398/38 |
| 2008/0159744 A1* | 7/2008 | Soto | H04B 10/808 398/115 |
| 2009/0074369 A1* | 3/2009 | Bolton | G02B 6/3887 385/135 |
| 2009/0116381 A1* | 5/2009 | Kanda | H04L 47/10 370/229 |
| 2009/0168648 A1* | 7/2009 | Labovitz | H04L 43/00 370/229 |
| 2009/0228941 A1* | 9/2009 | Russell | H04L 12/1868 725/107 |
| 2009/0322912 A1* | 12/2009 | Blanquart | H04N 5/2351 348/241 |
| 2010/0115627 A1* | 5/2010 | Chow | G06F 21/10 726/28 |
| 2010/0261367 A1* | 10/2010 | Billman | H01R 13/622 439/271 |
| 2010/0332401 A1* | 12/2010 | Prahlad | G06F 3/0649 705/80 |
| 2011/0275344 A1* | 11/2011 | Momtahan | H04L 12/14 455/405 |
| 2012/0071168 A1* | 3/2012 | Tomici | H04W 40/04 455/445 |
| 2012/0089664 A1* | 4/2012 | Igelka | G06F 9/5083 709/203 |
| 2012/0101952 A1* | 4/2012 | Raleigh | G06Q 30/016 705/304 |
| 2012/0236750 A1* | 9/2012 | Bugenhagen | H04L 41/08 370/252 |
| 2012/0329501 A1* | 12/2012 | Balck | H04W 28/06 455/509 |
| 2013/0166623 A1* | 6/2013 | Stanwood | H04W 4/00 709/202 |
| 2013/0198374 A1* | 8/2013 | Zalmanovitch | H04L 43/045 709/224 |
| 2013/0290155 A1* | 10/2013 | Wilson | G06Q 40/02 705/35 |
| 2014/0023030 A1* | 1/2014 | Jeong | H04W 76/19 370/329 |
| 2014/0023055 A1* | 1/2014 | Jeong | H04L 5/001 370/336 |
| 2014/0075464 A1* | 3/2014 | McCrea | G06F 19/3418 725/14 |
| 2014/0089013 A1* | 3/2014 | Saimbi | G06Q 40/08 705/4 |
| 2014/0183269 A1* | 7/2014 | Glaser | G06F 21/32 235/492 |
| 2014/0247797 A1* | 9/2014 | Monzen | H04L 1/0015 370/329 |
| 2014/0301197 A1* | 10/2014 | Birke | H04L 47/52 370/235 |
| 2014/0355427 A1* | 12/2014 | Cheng | H04L 47/24 370/230 |
| 2015/0023161 A1* | 1/2015 | Alisawi | H04W 28/02 370/230 |
| 2015/0085695 A1* | 3/2015 | Ryckbosch | H04L 43/04 370/253 |
| 2015/0169509 A1* | 6/2015 | Seshadri | G06F 17/2247 705/14.64 |
| 2015/0301903 A1* | 10/2015 | Mutha | G06F 16/162 707/692 |
| 2016/0012182 A1* | 1/2016 | Golay | G16H 40/20 705/3 |
| 2016/0142557 A1* | 5/2016 | Ramprasad | H04L 12/1417 455/406 |
| 2017/0195194 A1* | 7/2017 | Chen | H04L 43/0876 |
| 2017/0316457 A1* | 11/2017 | Gralla | G06Q 30/0254 |

* cited by examiner

CUSTOMER PREMISES NETWORK ACCESS DEVICE FOR DISPLAYING DATA USAGE

TECHNICAL FIELD

This disclosure relates to displaying data usage to a user, and more particularly to a customer premises network access device for displaying data usage to the user.

BACKGROUND

Data providers, such as internet service providers (ISPs) for example, provide content in the form of data to a user via one or more customer premises network access devices, such as modems, routers, access points, etc. Many data providers are moving away from offering unlimited data access to their users and are moving toward metered data, in which the user is responsible for an amount of data being consumed. In addition, many data providers are beginning to offer tiered content, in which data associated with one tier has a first priority and/or a first pricing structure, while data associated with another tier has a second priority and/or a second pricing structure. As a result, it can be difficult for a user to quickly and accurately determine an amount of data usage associated with a particular consumer premises network access device.

SUMMARY

Embodiments include a customer premises network access device for displaying data usage by the device to a user. In one embodiment, a customer premises network access device includes a housing and a network interface unit at least partially disposed therein, for communicating with a data network and providing access to the data network to a user. The customer premises network access device also includes a processing unit disposed in the housing and communicatively coupled to the network interface unit. The processing unit is configured to determine an aggregate amount of data associated with the network interface unit over a predetermined time period, and to determine a data value based on the determined aggregate amount of data. An exterior-facing display receives the data value from the processing unit, and displays an indicium based on the data value. One advantage of this arrangement is that a user can see indicia of the user's data usage at a glance by looking at the display of the customer premises network access device. This allows the user to more quickly discover whether data is being overconsumed by a device connected to the network through the customer premises network access device, and allows the user to predict and estimate future data usage proactively.

In one embodiment, a customer premises network access device is disclosed. The customer premises network access device comprises a housing. The customer premises network access device further comprises a network interface unit at least partially disposed in the housing. The network interface unit is configured to communicate with a data network. The customer premises network access device further comprises a processing unit disposed in the housing and communicatively coupled to the network interface unit. The processing unit is configured to determine an aggregate amount of data associated with the network interface unit over a predetermined time period. The processing unit is further configured to determine a data value based on the determined aggregate amount of data. The customer premises network access device further comprises an exterior-facing display. The display is configured to receive the data value from the processing unit. The display is further configured to display an indicium based on the data value.

In another embodiment, a method for displaying data usage to a user of the customer premises network access device is disclosed. The method comprises communicating with a data network via a network interface unit of the customer premises network access device over a predetermined time period. The method further comprises determining, via a processing unit disposed in a housing of the customer premises network access device, an aggregate amount of data associated with the network interface unit over the predetermined time period. The method further comprises determining, via the processing unit, a data value based on the determined aggregate amount of data. The method further comprises displaying, via an exterior-facing display, an indicium based on the data value.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein, the articles "a" and "an" in reference to a feature, such as "customer premises network access device," refer to "one or more" of the feature, such as "one or more customer premises network access devices," unless otherwise specified.

Embodiments include a customer premises network access device (CPNAD) for displaying data usage by the device to the user. In one embodiment, a customer premises network access device includes a housing and a network interface unit at least partially disposed therein, for communicating with a data network and providing access to the data network to a user. The CPNAD also includes a processing unit disposed in the housing and communicatively coupled to the network interface unit. The processing unit is configured to determine an aggregate amount of data associated with the network interface unit over a predetermined time period, and to determine a data value based on the determined aggregate amount of data. An exterior-facing display receives the data value from the processing unit, and displays an indicium based on the data value. One advantage of this arrangement is that the user can see indicia of the user's data usage at a glance by looking at the display of the CPNAD. This allows the user to more quickly discover whether data is being overconsumed by a device connected to the network through the CPNAD, and allows the user to predict and estimate future data usage proactively.

Figure 1:
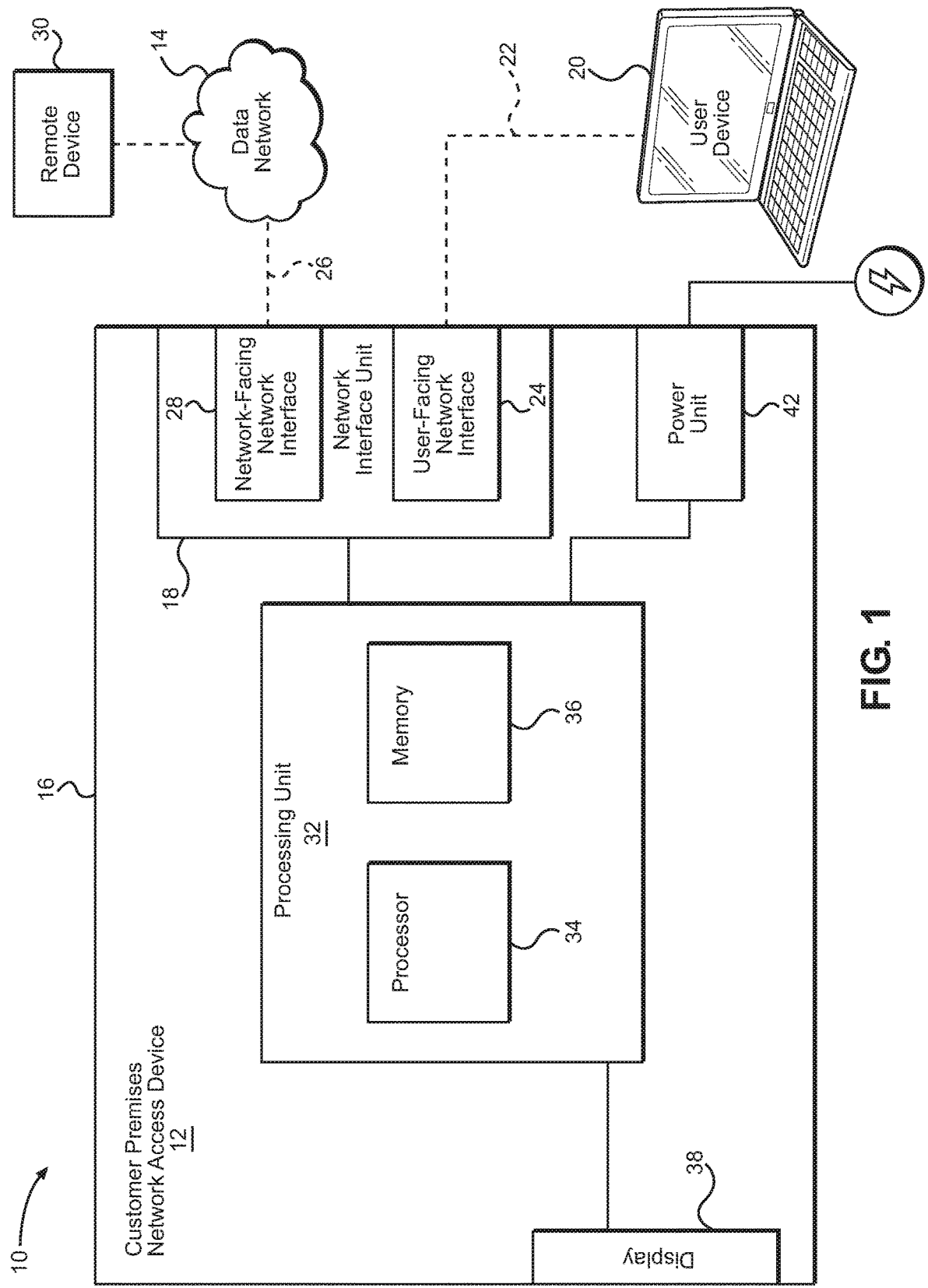
FIG. 1 illustrates a schematic view of a system having a customer premises network access device for providing network access to a user according to an embodiment.

In this regard, FIG. 1 illustrates a system 10 having a CPNAD 12 for providing network access to a user of a data network 14. The CPNAD 12 includes a housing 16 and a network interface unit 18 at least partially disposed therein, for communicating with the data network 14 and providing access to the data network to a user device 20, such as a personal computer or other computing device, for example, via a communication medium 22, e.g., an Ethernet, USB, Wi-Fi, Bluetooth, etc., connected between a user-facing network interface 24 of the network interface unit 18. The network interface unit 18 is connected to the data network 14 via another communication medium 26, e.g., Ethernet, coaxial cable, optical fiber, etc., connected between the data network 14 and a network-facing network interface 28. The network interface unit 18 is configured to send and receive data to and from any number of remote devices 30, such as server devices or peer devices, via the data network 14.

The CPNAD 12 also includes a processing unit 32 disposed in the housing 16 and connected to the network interface unit 18. The processing unit 32 may include a processor 34 and a main memory 36, for example. The processing unit 32 is configured to determine an aggregate amount of data associated with the network interface unit 18 over a predetermined time period. For example, the determining the aggregate amount of data may include measuring an amount of data passing through the network interface unit over the predetermined time period, or may include receiving a remote data value from a remote server associated with the CPNAD, the remote data value indicative of the aggregate amount of data.

The processing unit 32 is also configured to determine a data value based on the determined aggregate amount of data. An exterior-facing display 38 viewable to the user from outside the housing 16 receives the data value from the processing unit 32, and displays an indicium 40 (shown in FIG. 2B below) based on the data value to the user. As discussed above, one advantage of this system 10 is that a user can see indicia 40 of the user's data usage at a glance by looking at the exterior-facing display 38 of the CPNAD 12. In some embodiments, the exterior-facing display 38 may be include a liquid-crystal display (LCD), and may include a pixel array configured to display graphics. This allows the user to more quickly discover whether data is being overconsumed by a user device 20 connected to the data network 14 through the CPNAD 12, and allows the user to predict and estimate future data usage proactively.

The CPNAD 12 of these and other embodiments can be embodied in a number of different types of customer device. For example, the CPNAD 12 may be a modem or transceiver for connecting a user network with an internet service provider (ISP) or other network provider. These types of devices may include a cable modem for accessing a cable data network, a digital subscriber line (DSL) modem for accessing a DSL data network, or an optical network unit (ONU) device for accessing a fiber optic data network, for example. The CPNAD 12 may also be embodied in other types of devices, such as, for example, a gateway device, a wireless access point, or a router.

Figure 2A:
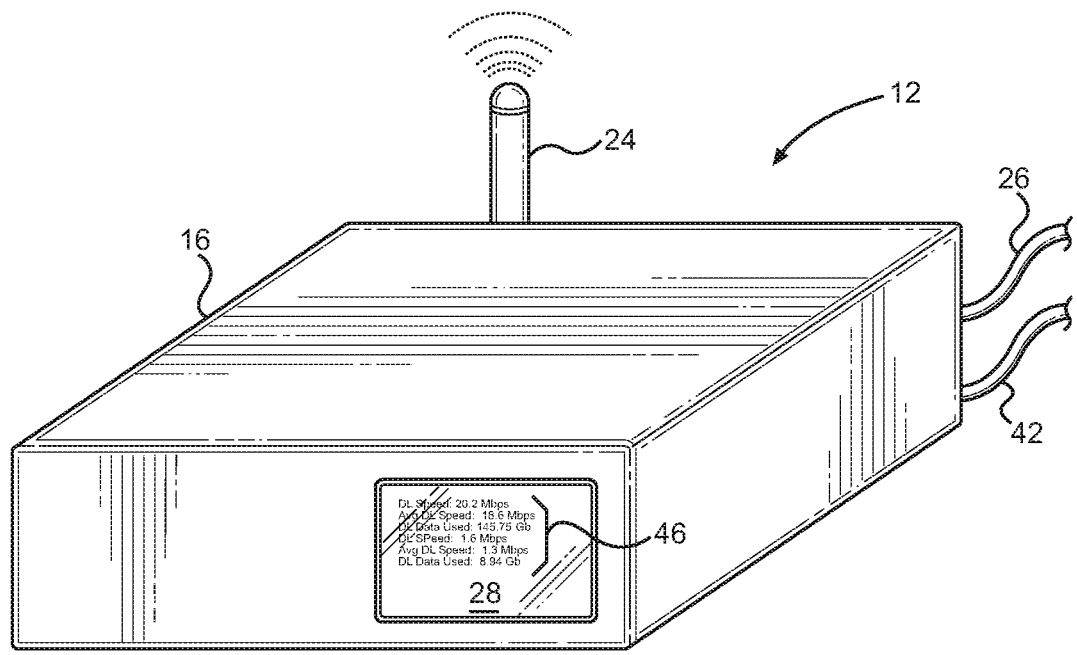
FIGS. 2A and 2B illustrate front and rear perspective views of the customer premises network access device of FIG. 1, showing the customer premises network access device display and indicia of data usage by devices connected to the customer premises network access device.
Figure 2B:
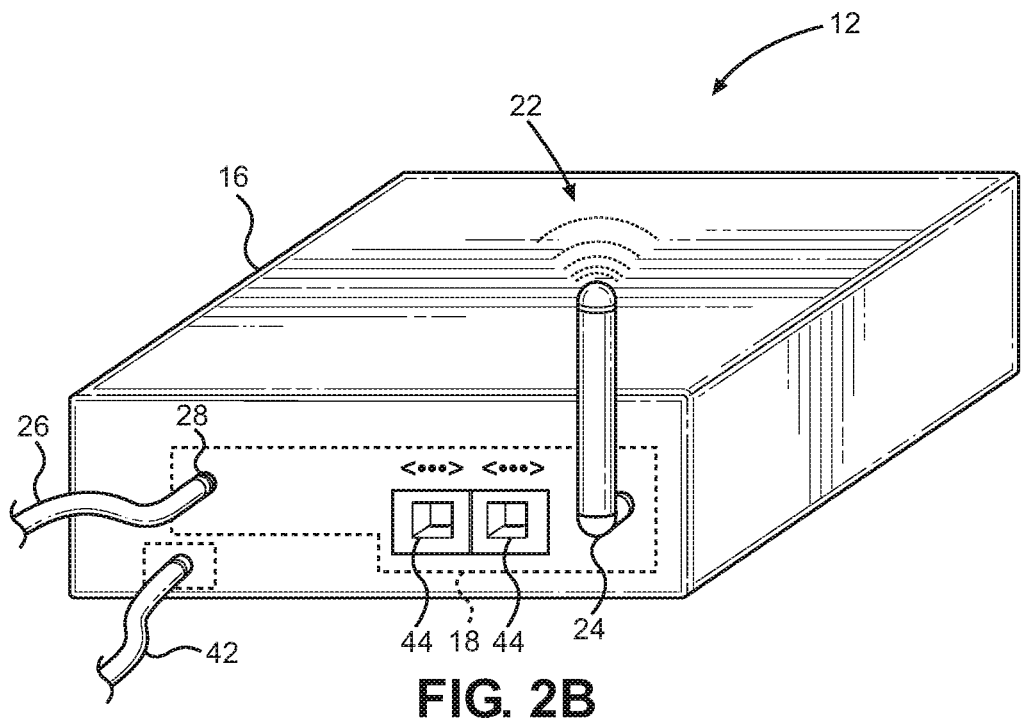

In this regard, FIGS. 2A and 2B illustrate front and rear perspective views of the CPNAD 12 according to an embodiment. In this embodiment, the CPNAD 12 is a combination modem and wireless router, but as discussed above, the CPNAD 12 may be embodied in many other types of device as well.

In this embodiment, the communication medium 26 is a coaxial cable connection, but it should be understood that the communication medium 26, as well as the communication medium 22 of FIG. 1, may be embodied in a number of different types of media, including, for example, wired connections such as Ethernet, public switched telephone network (PSTN), and optical fiber, or wireless connections such as Wi-Fi. In addition to the features described above with respect to FIG. 1, the CPNAD 12 of FIGS. 2A and 2B also includes a connection to a power unit 42. In this embodiment, the user-facing network interface 24 is a wireless Wi-Fi interface, and the network interface unit 18 also includes a pair of Ethernet ports 44 for hard-wiring additional user devices 20 to the CPNAD 12.

The CPNAD 12 may be configured to determine aggregate amounts of different types of data as well. In this regard, the aggregate amount of data may include an aggregate amount of downlink data and/or an aggregate amount of uplink data. The aggregate amount of data may also include an aggregate amount of high priority data having a high network priority, and/or an aggregate amount of low priority data having a low network priority lower than the high network priority. The data value may similarly comprise a high priority data value corresponding to the determined aggregate amount of high priority data, and a low priority data value corresponding to the determined aggregate amount of low priority data. This may permit the CPNAD 12 to separately determine and display the aggregate amounts of data for these different data types, which may have different quotas or pricing structures for example.

Figure 3A:
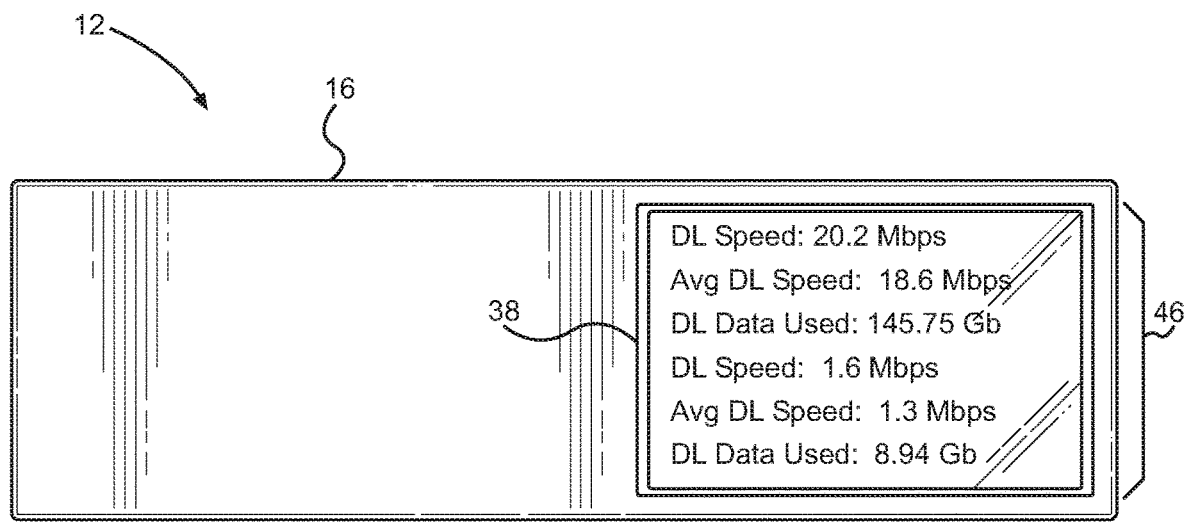
FIGS. 3A and 3B illustrate examples of indicia that can be displayed by the display of the customer premises network access device of FIG. 1, based on data usage determined by the customer premises network access device.
Figure 3B:
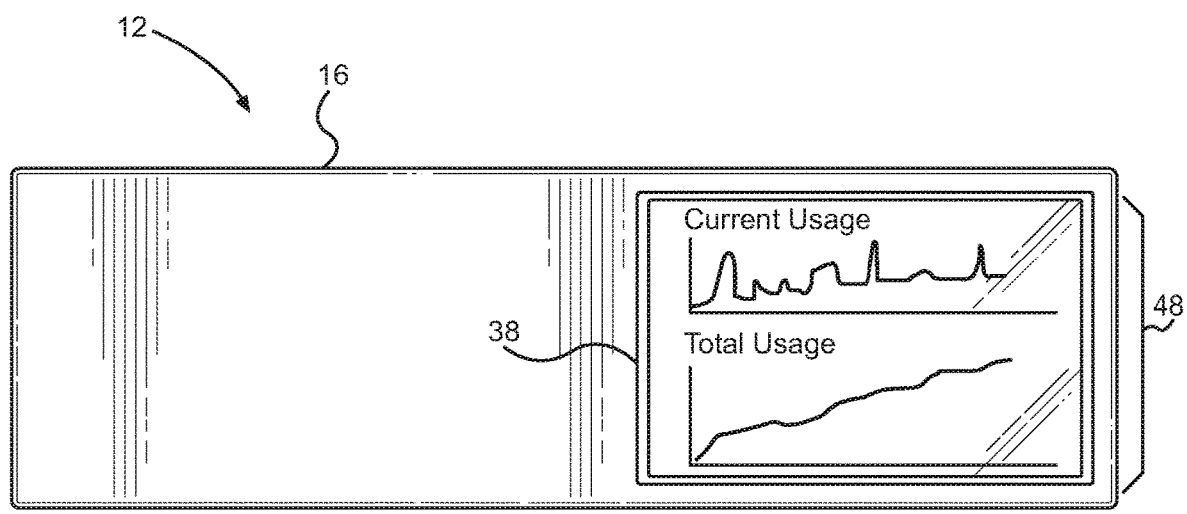

In this regard, the indicium 40 may comprise a high priority data indicium based on the high priority data value, and a low priority data indicium based on the low priority data value. As shown in greater detail in FIGS. 3A and 3B, the indicium 40 may include number and/or text 46, and may also include graphics 48, such as a graph of data usage by a user of the CPNAD 12 over a second predetermined period of time, for example.

Many other arrangements are contemplated. For example, the aggregate amount of data may also be an aggregate amount of billable data comprising data that is billable to the user of the CPNAD. The data value may also correspond to a determined cumulative amount of data passing through the network interface unit over the predetermined time period, which may correspond to a billing period of the user of the CPNAD. The data value may also comprise a rate of data associated with the network interface unit over the predetermined time period. The data value may also comprise one or more of an aggregate amount of data transferred by the user of the CPNAD, an aggregate amount of data remaining in a data quota associated with the user, a projected amount of data associated with a second predetermined time period based on the aggregate amount of data, or a rate of data usage over the predetermined time period associated with the user.

Figure 4:
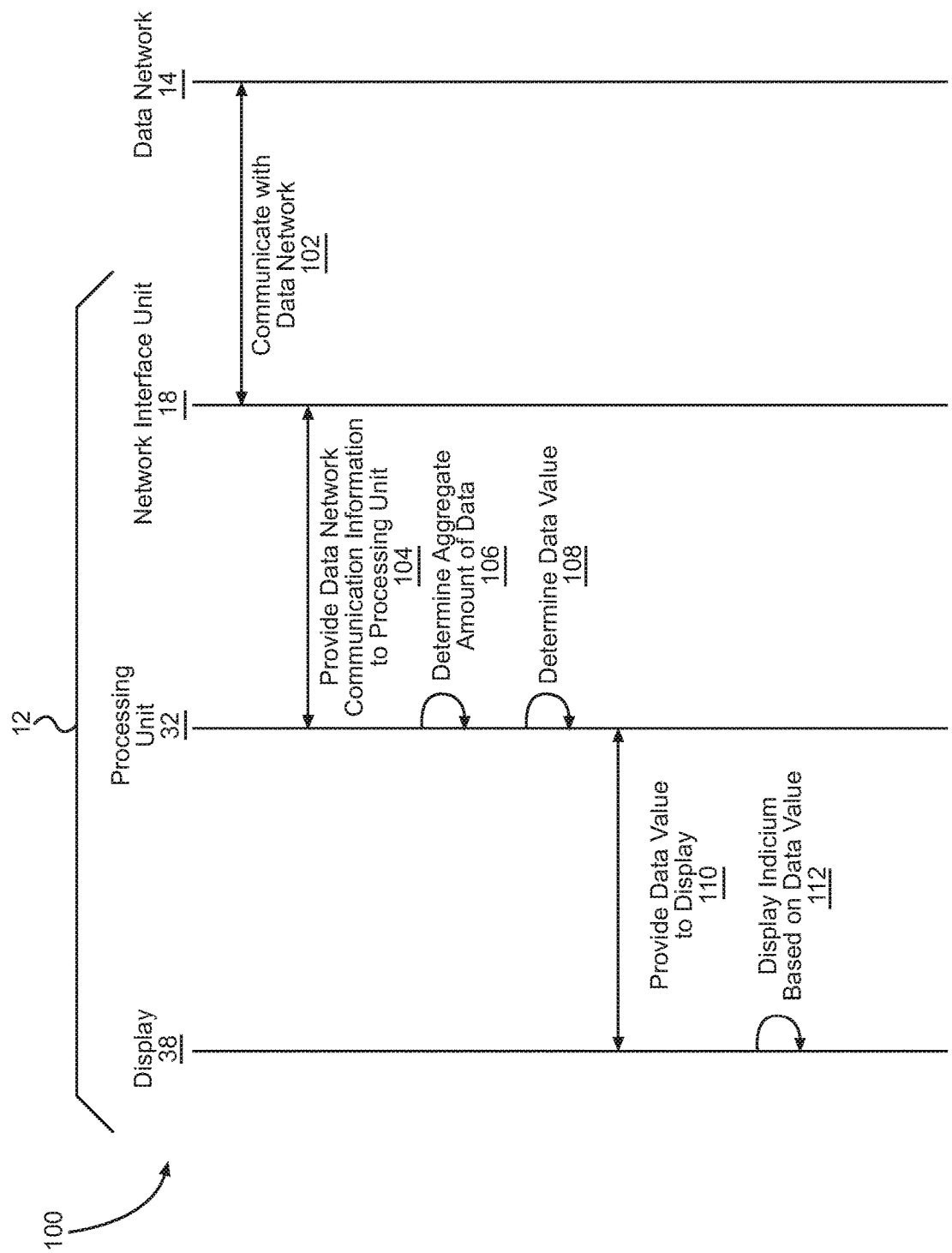
FIG. 4 is a communication diagram showing a method of determining and displaying an indicium of data usage by the customer premises network access device.

Referring now to FIG. 4, a communication diagram of a method 100 of using the CPNAD 12 of FIGS. 1-3B is described. The method includes communicating with a data network 14 via the network interface unit 18 of the CPNAD 12 over a predetermined time period (Block 102). The network interface unit 18 provides the data network 14 communication information to the processing unit 32 (Block 104), and the processing unit 32 communicates an aggregate amount of data associated with the network interface unit 18 over the predetermined time period (Block 106). The method further comprises determining, via the processing unit 32, a data value based on the determined aggregate amount of data (Block 108). The data value is provided to the exterior-facing display 38 viewable to a user of the CPNAD 12 from outside the housing 16 (Block 110) and the exterior-facing display 38 displays an indicium 40 based on the data value to the user (Block 112).

Figure 5:
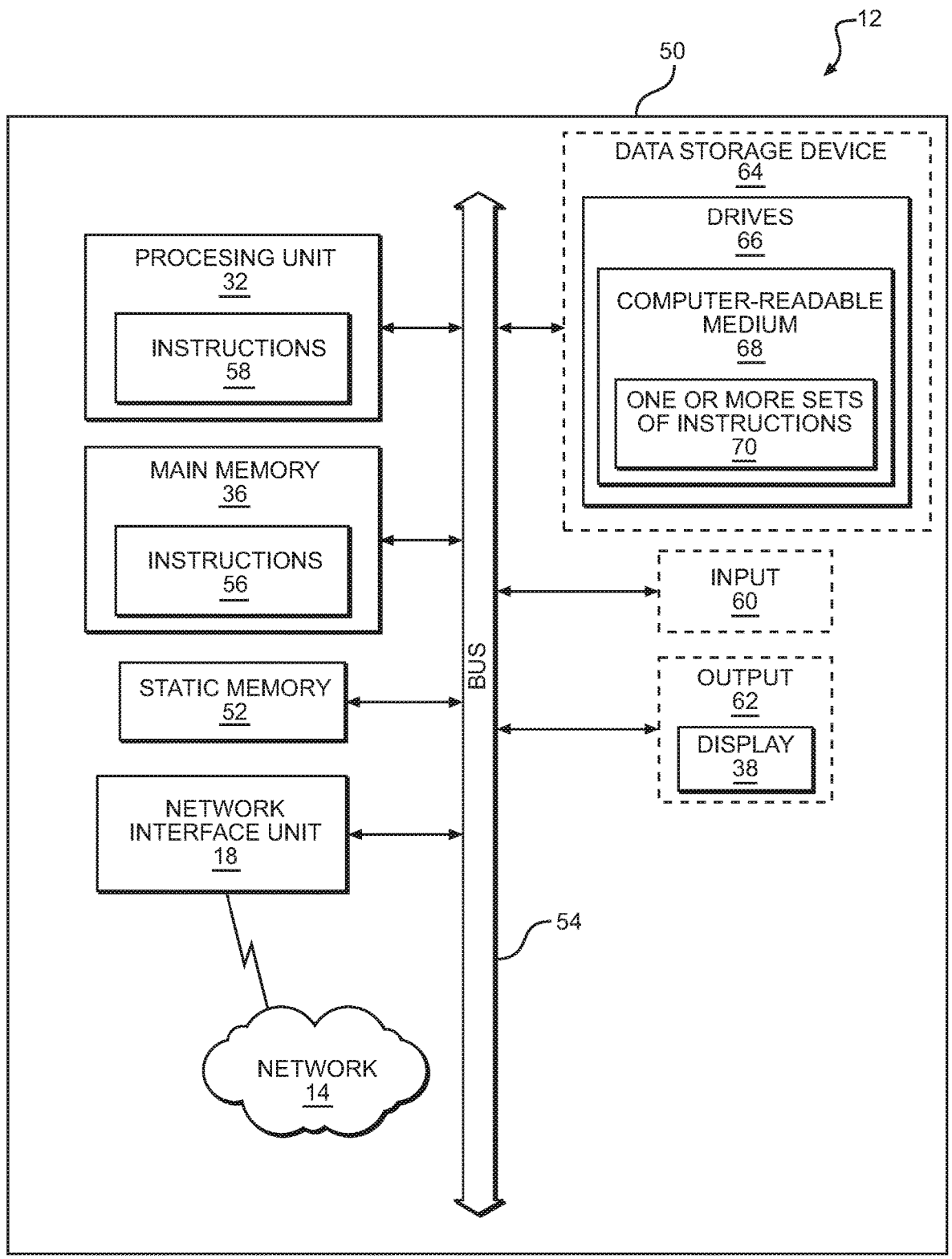
FIG. 5 is a block diagram of an exemplary processor-based system that can include the customer premises network access device, or other devices disclosed by FIGS. 1A-3B.

FIG. 5 provides a schematic diagram representation of a CPNAD 12 in the form of an exemplary processor-based computer system 50 adapted to execute instructions from an exemplary non-transitory computer-readable medium to perform the functions described herein. In this regard, the CPNAD 12 may comprise the computer system 50 within which a set of instructions for causing the computer system 50 to perform any one or more of the methodologies discussed herein may be executed. The computer system 50 may be connected (as a non-limiting example, networked) to other machines in a local area network (LAN), an intranet, an extranet, or the Internet. The computer system 50 may operate in a client-server network environment, or as a peer machine in a peer-to-peer (or distributed) network environment. While only a single computer system 50 is illustrated, the terms "controller" and "server" shall also be taken to include any collection of machines that individually or jointly execute a set (or multiple sets) of instructions to perform any one or more of the methodologies discussed herein.

The exemplary computer system 50 includes a processing unit 32 or processor 34, a main memory 36 (as non-limiting examples, read-only memory (ROM), flash memory, dynamic random access memory (DRAM) such as synchronous DRAM (SDRAM), etc.), and a static memory 52 (as non-limiting examples, flash memory, static random access memory (SRAM), etc.), which may communicate with each other via a bus 54. Alternatively, the processing unit 32 may be connected to the main memory 36 and/or the static memory 52 directly or via some other connectivity means.

The computer system 50 represents one or more processing units such as a microprocessor, central processing unit, or the like. More particularly, the processing unit 32 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The computer system 50 is configured to execute processing logic in instructions 56 and/or cached instructions 58 for performing the operations and steps discussed herein.

The computer system 50 may further include a communications interface in the form of a network interface unit 18. It also may or may not include an input 60 to receive input and selections to be communicated to the computer system 50 when executing instructions. It also may or may not include an output 62, including but not limited to display(s) 38, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 50 may or may not include a data storage device 64 that includes using drive(s) 66 to store functions herein described in non-transitory computer-readable medium 68 on which is stored one or more sets of instructions 70 (e.g., software) embodying any one or more of the methodologies or functions described herein. The one or more sets of instructions 70 may also reside, completely or at least partially, within the main memory 36 and/or within the computer system 50 during execution thereof by the computer system 50, the main memory 36, and the processing unit 32 also constituting machine-accessible storage media. The instructions 56, 58, and/or 70 may further be transmitted or received over a data network 14 via the network interface unit 18. The data network 14 can be an intra-network or an inter-network.

While the non-transitory computer-readable medium 68 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 70. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, and optical and magnetic media.

Devices and systems according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another non-transitory computer-readable medium and executed by a processor or other processing unit, or combinations of both. The master devices, and slave devices described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A customer premises network access device comprising:
    a housing;
    a network interface unit at least partially disposed in the housing, the network interface unit configured to provide access of a data network to a plurality of user devices, the network interface unit comprising:
        a network-facing network interface configured to communicate with the data network; and
        a user-facing network interface configured to communicate with the plurality of user devices;
    a processing unit disposed in the housing and communicatively coupled to the network interface unit, the processing unit configured to:
        receive data at the network-facing network interface and present the data to the user-facing network interface;
        receive data at the user-facing network interface and present the data to the network-facing network interface;
        determine an aggregate amount of data associated with the network interface unit over a predetermined time period; and
        determine a data value based on the aggregate amount of data; and
    an exterior-facing display fixed to the housing and configured to:
        receive the data value from the processing unit; and
        display an indicium based on the data value.

2. The customer premises network access device of claim 1, wherein the processing unit is further configured to determine the aggregate amount of data by measuring an amount of data passing through the network interface unit over the predetermined time period.

3. The customer premises network access device of claim 1, wherein the processing unit is further configured to determine the aggregate amount of data by receiving a remote data value from a remote server associated with the customer premises network access device, the remote data value indicative of the aggregate amount of data.

4. The customer premises network access device of claim 1, wherein the customer premises network access device is a device selected from the group consisting of: a cable modem, a digital subscriber line (DSL) modem, an optical network unit (ONU) device, a gateway device, a wireless access point, and a router.

5. The customer premises network access device of claim 1, wherein the network interface unit is configured to communicate with the data network via a medium selected from the group consisting of: Ethernet, public switched telephone network (PSTN), coaxial cable, optical fiber, and Wi-Fi.

6. The customer premises network access device of claim 1, wherein the aggregate amount of data comprises an aggregate amount of downlink data.

7. The customer premises network access device of claim 1, wherein the aggregate amount of data comprises an aggregate amount of uplink data.

8. The customer premises network access device of claim 1, wherein determining the aggregate amount of data by the processing unit comprises determining an aggregate amount of high priority data having a high network priority, and determining an aggregate amount of low priority data having a low network priority lower than the high network priority.

9. The customer premises network access device of claim 8, wherein the data value comprises a high priority data value corresponding to the determined aggregate amount of high priority data, and a low priority data value corresponding to the determined aggregate amount of low priority data.

10. The customer premises network access device of claim 9, wherein the indicium comprises a high priority data indicium based on the high priority data value, and a low priority data indicium based on the low priority data value.

11. The customer premises network access device of claim 10, wherein the predetermined time period corresponds to a billing period of a user of the customer premises network access device.

12. The customer premises network access device of claim 1, wherein the aggregate amount of data comprises an aggregate amount of billable data comprising data that is billable to a user of the customer premises network access device.

13. The customer premises network access device of claim 1, wherein the data value corresponds to a determined cumulative amount of data passing through the network interface unit over the predetermined time period.

14. The customer premises network access device of claim 1, wherein the data value comprises a rate of data associated with the network interface unit over the predetermined time period.

15. The customer premises network access device of claim 1, wherein the exterior-facing display comprises a liquid-crystal display (LCD).

16. The customer premises network access device of claim 1, wherein the exterior-facing display comprises a pixel array configured to display graphics.

17. The customer premises network access device of claim 1, wherein the data value comprises a value selected from the group consisting of: an aggregate amount of data transferred by a user of the customer premises network access device, an aggregate amount of data remaining in a data quota associated with the user, a projected amount of data associated with a second predetermined time period based on the aggregate amount of data, and a rate of data usage over the predetermined time period associated with the user.

18. The customer premises network access device of claim 1, wherein the indicium comprises a number.

19. The customer premises network access device of claim 1, wherein the indicium comprises a graph of data usage by a user of the customer premises network access device over a second predetermined period of time.

20. A method for displaying data usage to a user of a customer premises network access device, the method comprising:

communicating with a data network via a network interface unit of the customer premises network access device over a predetermined time period, the network interface unit at least partially disposed in a housing, the network interface unit configured to provide access of the data network to a plurality of user devices, the network interface unit comprising a network-facing network interface configured to communicate with the data network, and a user-facing network interface configured to communicate with the plurality of user devices;

determining, via a processing unit disposed in the housing of the customer premises network access device, an aggregate amount of data associated with the network interface unit over the predetermined time period;

determining, via the processing unit, a data value based on the determined aggregate amount of data; and displaying, via an exterior-facing display fixed to the housing, an indicium based on the data value.

* * * * *